VOICE CONTROLLED AMPLIFIER

Filed Aug. 16, 1965

INVENTOR.
H. W. DODDINGTON
BY [signature]
ATTORNEY 3,423,531
Patented Jan. 21, 1969

3,423,531

VOICE CONTROLLED AMPLIFIER

Harold W. Doddington, Rio Piedras, Puerto Rico, assignor to International Telephone & Telegraph Corporation, New York, N.Y., a corporation of Maryland Filed Aug. 16, 1965, Ser. No. 479,936
U.S. Cl. 179—1 6 Claims
Int. Cl. H04m *1/00*

ABSTRACT OF THE DISCLOSURE

A hands-free telephone amplifier has a turn-on time which is different from its turn-off time. This eliminates the possibility that the system will go into oscillation by turning itself on and off. The prior art sometimes triggered such oscillations responsive to noises occurring in the room at the instant of turn-off.

This invention relates to circuits which are switched responsive to voice signals and more particularly to circuits for controlling amplifiers used in hands-free telephones.

Hands-free telephones are equipped with microphones and loudspeakers so that it is not necessary to lift a handset to hold a telephone conversation. It is only necessary to push a button and talk at a conversational level. The sound of the voice enters a microphone and is amplified. When the other conversing party is talking, the sound of his voice is heard coming out of the loudspeaker, also at conversation level. Thus, the same voice sound also feeds back into the microphone at the usual pick-up level. This means that there are the conditions for oscillation caused by acoustical coupling between microphone and loudspeaker. Those familiar with public address systems will readily recognize the problem.

Heretofore, the prior art has avoided these oscillations by utilizing the voice signal to provide feedback signal. The feedback biases the loud-speaker amplifier to an off condition while the local subscriber is talking into his microphone. For most purposes this feedback caused "off" bias solves the problems of oscillation.

However, one condition remains in these prior art devices which continues to cause problems. To illustrate this condition, consider the use of a hands-free telephone in a room having good echo producing wall surfaces. A microphone amplifier is biased to an "on" condition by the voice signal occurring when a subscriber begins to talk. The turn-on time of this amplifier must be very short to avoid clipping the first spoken syllable. While the subscribed is talking, his continuing voice signal causes his loud-speaker amplifier to remain biased to an off condition so that there is no acoustical feedback to cause oscillatory conditions. However, when the subscriber stops talking, if the off bias is removed from his loud-speaker amplifier soon enough that it is able to pass the last spoken sound, or an echo, at that instant, there is acoustical coupling between the microphone amplifier and loud-speaker amplifier. If the subscriber on the other end of the telephone line immediately begins talking, his voice signal takes command of the hands-free amplifier, and again there is no problem. However, at the instant when there is acoustical coupling, if there is a loud noise or echo in the room where the active microphone is located, a signal is sent to the distant end of the telephone line where the loud-speaker reproduces sound to make the microphone amplifier turn on fast. But, there is no continuing sound to hold that loud-speaker in an "off" condition. Thus, at each end, there is an acoustical feedback which returns a loud-speaker to microphone signal from that end. Therefore, a back and fourth signaling condition can begin while the amplifiers turn off and on at opposite ends of the line.

Accordingly, an object of the invention is to provide a new and improved two-way voice controlled amplifier system. More particularly, an object is to provide an improved voice signal controlled hand-free telephone. In this ocnnection, an object is to provide a two-way loudspeaking telephone with a controlled turn-on time which is independent of the turn-off time.

In keeping with one aspect of this invention, a two-way amplification system is associated with, and controlled by, a voice operated electronic switching device. This switching device is given turn-on and turn-off characteristics which are independent of each other. The turn-on time is made very fast to avoid clipping first syllables. The turn-off time is made relatively slow to avoid the acoustical coupling which causes oscillation conditions. This way, there is no instant when such acoustical coupling may cause a feedback for producing oscillations.

The above mentioned and other features of this invention and the manner of obtaining them will become more apparent, and the invention itself will be best understood by reference to the following description of an embodiment of the invention taken in conjunction with the accompanying drawings, in which.

Figure 1:
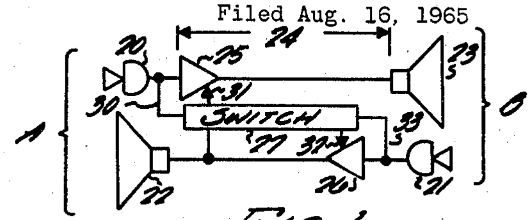
FIG. 1 is a block diagram which shows how the loudspeaking, hands-free telephone system operates.

A two-way, loudspeaking, hands-free telephone system is shown in FIG. 1. It includes a pair of microphones 20, 21 and a pair of loud-speakers 22, 23, one of each being located at each end of a voice path 24, which may be a telephone line. The voice path 24 includes first and second amplifiers 25, 26 for conducting signals in opposite directions. A first subscriber A talks into microphone 20 and listens at loud-speaker 22 while a second subscriber B talks into microphone 21 and listens at loud-speaker 23.

A voice switch 27 for the loudspeaking telephone is interposed between the two amplifiers 25, 26 to control their "on" or "off" conditions. This voice switch provides means for selectively applying an enabling signal to one of two output terminals 31, 32 while applying an inhibiting signal to the other of the terminals. The enabling signal is applied quickly, and the inhibiting signal is removed slowly.

If, for example, subscriber A talks, the voice switch input signals appear at 30 and cause an enabling output at 31 for quickly turning on the amplifier 25 and enabling the loud-speaker 23. It also causes an inhibiting signal at 32 for turning off the amplifier 26 and inhibiting the loud-speaker 22. When he stops talking, the inhibiting signal at 32 disappears slowly. Likewise, if the subscriber B starts talking, the input voice signal at 33 quickly turns on amplifier 26 by applying a signal at 32 and turns off the loud-speaker 23 by applying an inhibiting signal at 31. When subscriber B stops talking, the signal disappears from the terminal 31 and slowly turns on the loud-speaker 23.

Figure 2:
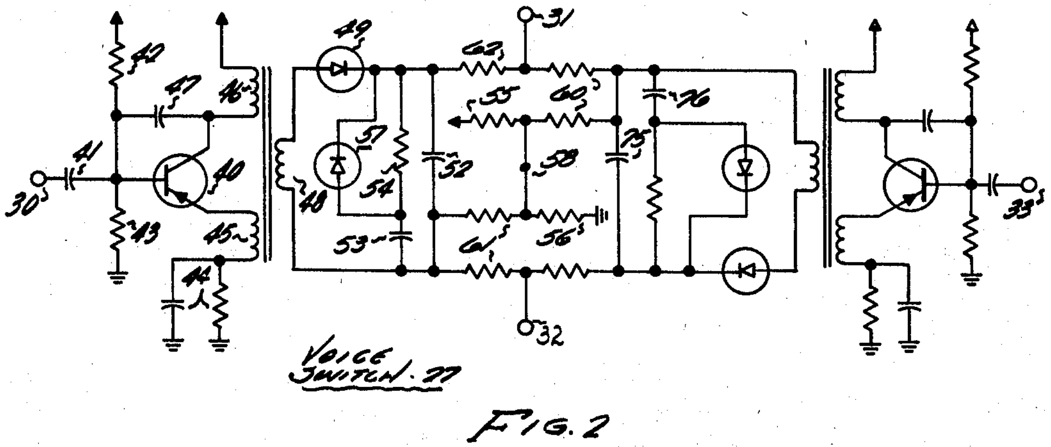
FIG. 2 is a schematic circuit diagram which shows how the voice switching device is constructed.

The circuit details of the switch 27 are shown in FIG. 2 where the input and output terminals 30–33 are numbered the same as those shown in FIG. 1.

The components in FIG. 2 include a PNP transistor 40 wired in a common emitter configuration and functioning as a signal amplifier. The transistor has a base electrode capacitively coupled at 41 to input terminal 30. This same base is biased to an "on" condition by voltage divider 42, 43. The emitter has a conventional R.C. bias circuit 44 connected in series with a feedback stabilization transformer winding 45. The collector load is an A.C. coupling or primary winding 46 on the same transformer. A capacitor 47 provides a base to collector short circuit for high frequency A.C. cancellation.

The voice signals appearing at input 30 and amplified at 40 are applied via a secondary transformer winding 48 to the voice switching circuit.

The voice switch 27 also includes a rectifier 49 coupled to the secondary winding 48 for converting the voice signal into a D.C. bias potential.

Coupled across the secondary winding 48 and rectifier 49 are a large capacitor 53 in series with a large resistor 54. A small capacitor 52 is connected in parallel with capacitor 53 and resistor 54. A rectifier 57 is connected in parallel with the large resistor 54. This rectifier is poled to decouple the two capacitors during charging and to couple the capacitors in parallel during discharging.

The first output terminal 31 is coupled to one side of the capacitors 52, 53, and the second output terminal 32 is coupled to the other side of the capacitors. Therefore, the polarities of the output voltages appearing at the output terminals are opposite and of a magnitude determined by the charge on the capacitors.

The charge built upon the relatively small capacitor 52 is used for speeding the microphone turn-on time at the start of a voice signal input. The charge built upon the relatively large capacitor 53 is used for slowing the loud-speaker turn-on time at the end of a voice signal input. The polarities of the voltages and diode are such that the capacitors 52, 53 are isolated from each other during charging while the microphone amplifier is being turned on. Thus, the fast charge built on capacitor 52 is used for controlling the microphone turn-on time. During discharge the capacitors are in parallel because a diode 57 short circuits the resistor 54 to put the two capacitors in parallel. Thus, the delay time is controlled by the discharge time of the two capacitors in parallel.

A voltage dividing network 55, 56 provides a reference voltage at point 58. The voltage is applied through resistors 60, 61 to points 31, 32, respectively. Ideally, these resistances 60, 61 will have identical electrical characteristics to avoid giving a preference between subscribers A and B. Resistor 62 provides an input connection to terminal 31 for the switching purposes.

The remaining components in FIG. 2 serve subscriber B and are identical to those serving subscriber A which have been described above.

The circuit operates this way: Assume that subscriber A is talking. His voice signal is split between amplifier 25 input and the voice switch input 30. The signal at input 30 is applied across the capacitor 41 to the base electrode of amplifier 40. The amplified signal is transformer coupled from primary winding 46 to secondary winding 48 with electrical effects in winding 45 which raise or lower the emitter bias at 40 to counteract voice signal caused changes in primary winding 46. This tends to give a uniform bias voltage as long as subscriber A is talking.

This bias voltage appears at terminals 31, 32 as the enable or inhibit voltages, respectively. The positive voltage at terminal 32 biases amplifier 26 (FIG. 1) to an off condition, and the negative voltage at terminal 31 biases the amplifier 25 to an on condition. Microphone 20 and loud speaker 23 are activated while microphone 21 and loud-speaker 22 are inactivated.

Next, consider what happens when subscriber A utters the first sound after a silent period. Both of the capacitors 52 and 53 were discharged during the silent period. When the first sound appears, small capacitor 52 charges very quickly to turn off the amplifier 26 and to turn on the amplifier 25. As shown by solid line 70 in Region I of FIG. 3, the turn-on time is in the order of 10 milliseconds.

Once capacitor 52 has charged and the bias potential polarities are established, it is irrelevant whether capacitor 53 has or has not charged fully. It will charge sufficiently as the conversation proceeds, as shown by dot-dashed line 71 in FIG. 3. The sound of the voice of subscriber A continues, as at 72, for an indefinite period of time. During this period (Region II, FIG. 3) both capacitors 52, 53 remain charged.

When the sound of subscriber A's voice disappears, the voice signal rectified at 49 disappears, and the capacitors 52, 53 begin to discharge. The voltage and diode polarities are such that these two capacitors are in parallel and discharge as a unit, as shown by the solid line curve 73 in Region III of FIG. 3. The 50 to 100 millisecond period required for this discharge is adequate to allow ambient room noise to die away before the loud-speaker 22 is turned on. This will prevent acoustically coupled circuit oscillations.

Next, consider the circuit operation when both subscribers are talking at the same time. Since their voice signals mix, they cannot understand each other if they talk simultaneously in almost any telephone system. Thus, to give a normal grade of service, the problem is not one of allowing them to understand each other; rather, the problem is one of controlling the amplifiers to prevent system instability.

If both persons talk at once, the currents in resistors 60, 61 oppose each other. The resulting voltages at terminals 31, 32 are such that neither amplifier receives an "on" bias.

Figure 3:
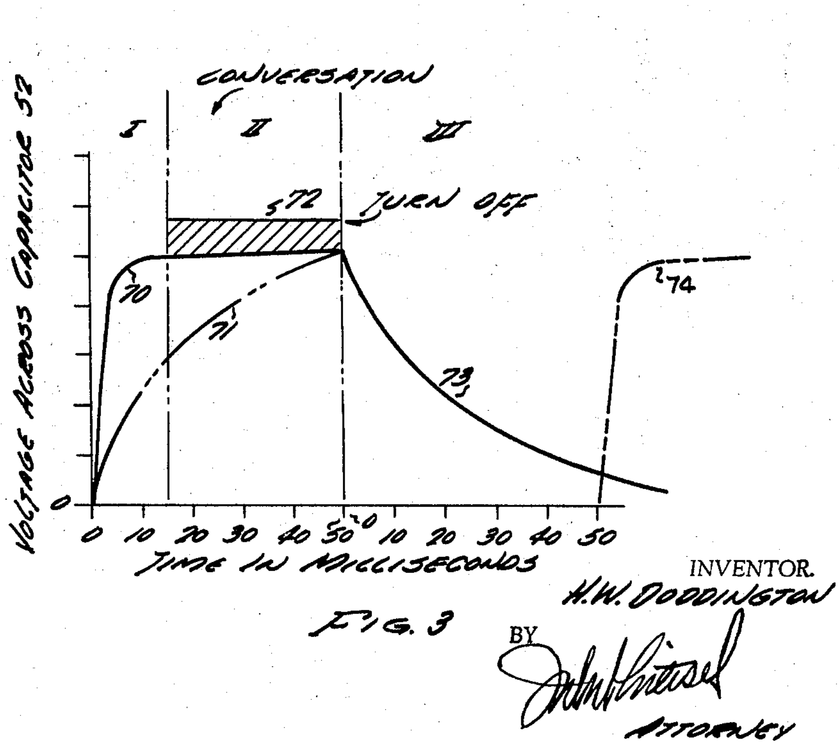
FIG. 3 is a graph explaining the independent turn-on and turn-off timing of the voice switching circuit.

If subscriber A is the first to stop talking, the charge on capacitors 52, 53 decays slowly as indicated by the solid line 73 in Region III of FIG. 3. The voice signal of subscriber A causes a charge to accumulate (if it had not already accumulated) on capacitors 75, 76, in the manner shown by the dot-dashed curve 74 of FIG. 3.

It is apparent from curves 73, 74 that conflicting demands may be momentarily placed on the voice switch 27. However, the conflict is such that the inhibition of the loud-speaker prevails momentarily and it is held off until the charges on the various capacitors reach the proper biasing polarities. This may result in some clipping of a first syllable. However, the electronic response time, as compared with the response time of the human ear, is such that the person who has just quit talking will not notice any clipped syllables.

Briefly, in resume, it is seen that the invention has provided a loud-speaking telephone system, including a microphone 20 for picking up conversation level speech sounds. A first amplifier 25, coupled to the microphone, amplifies the output thereof. A loud-speaker 23 reproduces these amplified signals as sound at a conversation level. A second amplifier 26 is provided for amplifying signals transmitted in an opposite direction. A voice responsive switch 27 is used for quickly turning on the amplifier 25 and turning off the amplifier 26 when the microphone first picks up the sound. This same switch 27 slowly turns on the amplifier 26 when the microphone stops receiving sound. This separates the send and receive switching functions with respect to time.

While the principles of the invention have been described above in connection with specific apparatus and applications, it is to be understood that this description is made only by way of example and not as a limitation on the scope of the invention.

I claim:

1. A two directional loudspeaking telephone system comprising means for picking up conversation level speech, first amplifier means coupled for transmitting in one of said two directions, said microphone being coupled to the input of said amplifier, loud-speaker means coupled to the output of said first amplifier for reproducing the amplified signals as sound at a conversation level, second amplifier means coupled for transmitting in the other of said two directions, and voice responsive switch means for turning on said first amplifier means at a first rate of speed responsive to the pick-up of sound by said microphone and turning on said second amplifier means at a rate which is slower than said first rate when said microphone stops receiving sound.

2. The telephone system of claim 1 wherein said voice responsive switch means comprises means for applying an enabling signal to one of two output terminals while applying an inhibiting signal to the other of said output terminals, and means for applying said enabling signal to said first amplifier means and said inhibiting signal to said second amplifier means.

3. The telephone system of claim 2 wherein said voice responsive switch means comprises a large capacitor in series with a large resistor and a small capacitor in parallel with said capacitor and resistor, one side of said capacitors being connected to one of said output terminals, the large capacitor being so connected via the large resistor, and the other side of said capacitors being connected to the other of said output terminals, and rectifier means connected in parallel with said resistor, said rectifier means being poled to decouple said capacitors during charging and to couple said capacitors in parallel during discharging.

4. A loudspeaking telephone comprising microphone means for originating signals transmitted in one direction, means including a loudspeaker for reproducing signals transmitted in an opposite direction, sound responsive means for quickly turning on said microphone means and turning off said means including a loudspeaker when sound first appears, and means responsive to termination of said sound for turning on said means including a loudspeaker at a rate which is slow relative to said quick turn on.

5. A voice switch for a loudspeaking telephone comprising means responsive to a voice signal for applying an enabling signal to one of two output terminals while applying an inhibiting signal to the other of said terminals, means for applying said enabling signal quickly and removing said inhibiting signal slowly relative to said quick application, means responsive to said enabling signal for transmitting in one direction sound produced electrical signals, and means responsive to said inhibiting signal for precluding the transmission in a opposite direction of electrical signals for producing sound.

6. The switch of claim 5 wherein said switch comprises a relatively large capacitor in series with a resistor and a relatively small capacitor in parallel with said capacitor and resistor, and rectifier means connected in parallel with said resistor, said rectifier means being poled to decouple said capacitors during charging and to couple said capacitors in parallel during discharging.

References Cited

UNITED STATES PATENTS

| | | | |
|---|---|---|---|
| 3,330,912 | 7/1967 | Koseki | 179—1 |
| 3,189,691 | 6/1965 | Simpson | 179—81 |
| 3,189,690 | 6/1965 | Millett | 179—81 |
| 3,171,901 | 3/1965 | Clemency et al. | 179—81 |
| 3,136,864 | 6/1964 | Cleary | 179—81 |
| 3,046,354 | 7/1962 | Clemency | 179—81 |
| 3,071,647 | 1/1963 | Grant | 179—1 |

WILLIAM C. COOPER, *Primary Examiner.*

R. P. TAYLOR, *Assistant Examiner.*

U.S. Cl. X.R.

179—81